United States Patent
Biemueller et al.

(10) Patent No.: US 9,600,774 B1
(45) Date of Patent: Mar. 21, 2017

(54) PREDICTIVE INSTANCE SUSPENSION AND RESUMPTION

(71) Applicant: Amazon Technologies, Inc., Reno, NV (US)

(72) Inventors: Sebastian Martin Biemueller, Dresden (DE); Christopher Richard Jacques de Kadt, Western Cape (ZA); Mathew Daniel, Gauteng (ZA); Adi Meyers, Western Cape (ZA); James Alfred Gordon Greenfield, Western Cape (ZA); Thomas Friebel, Hainichen (DE); Jean-Paul Bauer, Western Cape (ZA); Benjamin Van Der Merwe, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 381 days.

(21) Appl. No.: 14/037,345

(22) Filed: Sep. 25, 2013

(51) Int. Cl.
  *G06F 15/18* (2006.01)
  *G06N 5/04* (2006.01)
  *G06N 99/00* (2010.01)

(52) U.S. Cl.
  CPC .......... *G06N 5/048* (2013.01); *G06N 99/005* (2013.01)

(58) Field of Classification Search
  None
  See application file for complete search history.

(56) References Cited

U.S. PATENT DOCUMENTS

| | | | | |
|---|---|---|---|---|
| 8,397,242 B1* | 3/2013 | Conover | ................... | G06F 8/52 718/1 |
| 8,424,007 B1* | 4/2013 | Hernacki | ................ | G06F 9/485 718/103 |
| 2009/0199116 A1* | 8/2009 | von Eicken | ............... | G06F 8/63 715/764 |
| 2010/0325191 A1* | 12/2010 | Jung | ....................... | G06F 15/16 709/202 |
| 2010/0332643 A1* | 12/2010 | Benari | .................. | G06F 9/5077 709/224 |
| 2011/0078681 A1* | 3/2011 | Li | ....................... | G06F 9/45558 718/1 |
| 2012/0209568 A1* | 8/2012 | Arndt | .................. | G06F 11/3089 702/183 |
| 2013/0282776 A1* | 10/2013 | Durrant | ............ | G06F 17/30115 707/827 |
| 2014/0053265 A1* | 2/2014 | Crowley | ................. | H04L 43/12 726/22 |
| 2014/0173213 A1* | 6/2014 | Beveridge | ............. | G06F 3/0689 711/130 |

* cited by examiner

Primary Examiner — Luis Sitiriche
(74) Attorney, Agent, or Firm — Davis Wright Tremaine LLP

(57) ABSTRACT

Remote computing resource service providers allow customers to execute virtual computer systems in a virtual environment on hardware provided by the computing resource service provider. The hardware may be distributed between various geographic locations connected by a network. The distributed environment may increase latency of various operations of the virtual computer systems executed by the customer. To reduce latency of various operations predictive modeling is used to predict the occurrence of various operations and initiate the operations before they may occur, thereby reducing the amount of latency perceived by the customer.

25 Claims, 9 Drawing Sheets

PREDICTIVE INSTANCE SUSPENSION AND RESUMPTION

BACKGROUND

The use of remote computing services, such as remote program execution and remote data storage, has greatly increased in recent years. Customers may reduce expenses and overhead by purchasing these services from a computing resource service provider. Customers of the computing resource service provider can interact with computing systems, services and virtual machine instances which are widely distributed. Customers, for instance, may communicate with computers of other customers to access and/or provide data while using services of a computing resource service provider to operate virtual machine instances executing customer applications. In many instances, customers configure and operate remote virtual machine instances using hardware managed by computing resource service providers, thereby reducing infrastructure costs and achieving other advantages. Customer configured virtual machine instances are often used to perform a variety of functions that may take place regularly over an extended period of time. In addition, customer configured virtual machine instances often are not utilized all of the time, but are suspended and resumed as needed.

BRIEF DESCRIPTION OF THE DRAWINGS

Various embodiments in accordance with the present disclosure will be described with reference to the drawings, in which.

DETAILED DESCRIPTION

Figure 1:
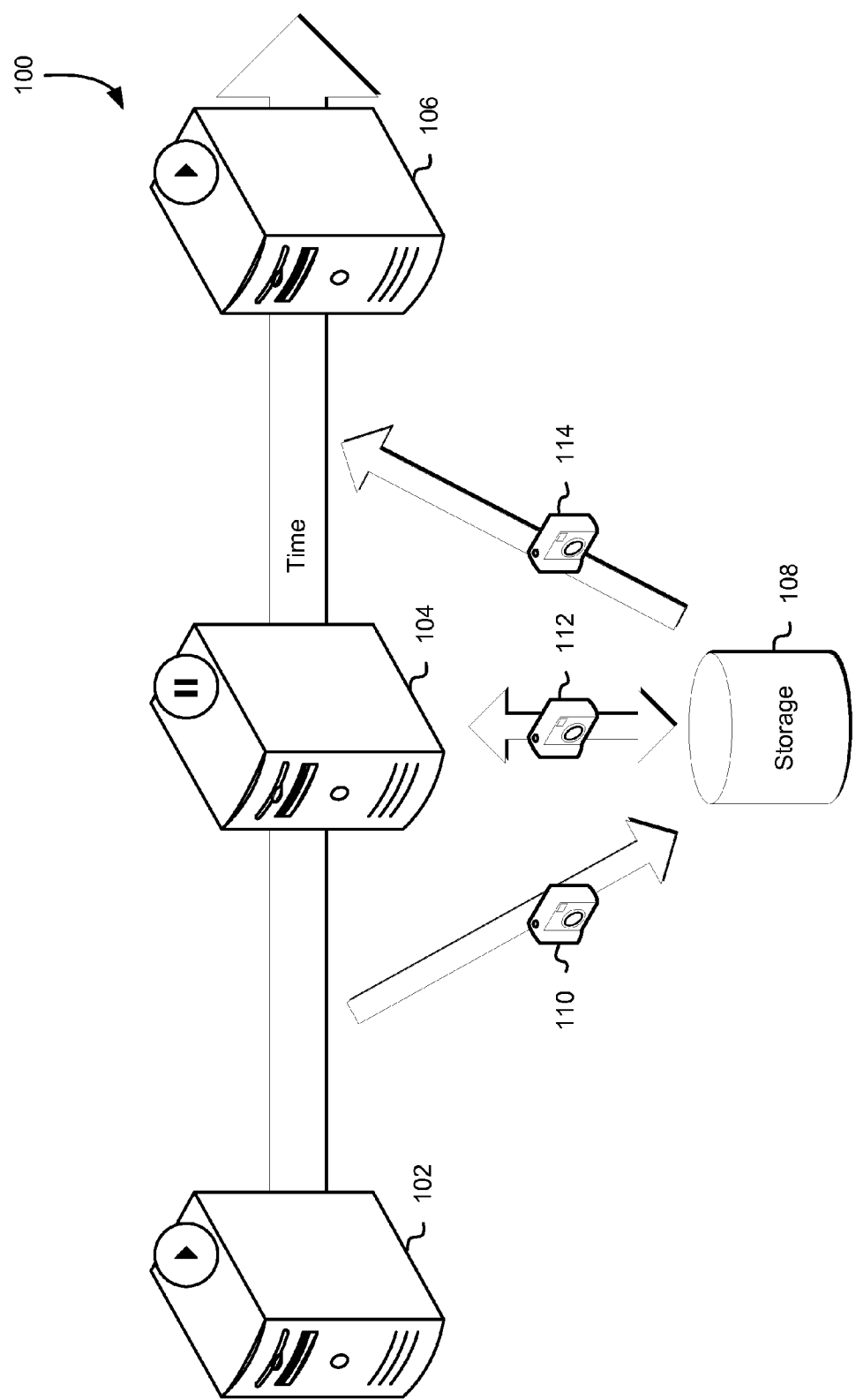
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for serialization and deserialization of virtual machine instances in a networked environment. In various embodiments, customers execute virtual machine instances (also referred to as computer system instances or simply as instances) on remote computing resources operated by the computing resource service provider. On occasion, customers may suspend the execution of instances and at some point later in time resume the execution of instances. Suspending execution of instances includes persisting the current state of the instance to a storage device so that once the customer resumes execution of the instance, the instance state can be read from persistent storage and the instance can return to pre-serialization execution. In a networked environment reading and writing instance data, including the current state of the instance to persistent storage, may be delayed due to latency in the network. Predictive modeling can be applied to information collected by the service provider in order to predict serialization events (for simplicity, serialization events include serialization and deserialization) and perform all or part of the serialization operations before the serialization events occurs in order to reduce latency.

In various embodiments, the service provider may collect information regarding the use and operation of instances in order to predict when the customer may request serialization or deserialization of one or more instances. Predicting a serialization event may include forecasting the likelihood of the serialization event based on available data, but does not require the serialization event to actually occur. In various embodiments, requests may be an appropriately configured Application Program Interface (API) call generated by a management console provided to the customer by the service provider. The information collected for use in generating the predictive model may be analyzed using one or more algorithms in order to generate the predictive model. Using the predictive model the service provider may initiate one or more serialization operations before the customer requests the corresponding serialization event. The predictive model may use one or more classifiers to determine the probability of a particular set of data belonging to a set of data indicating the serialization event will occur. For example, a predictive model generated based on customer actions may determine that the customer suspends an instance nightly at a particular time and resumes the instance the next morning at a particular time. The predictive model may indicate a specified probability of an event (e.g., suspension or resumption of an instance) occurring during various time intervals. Given a data set, classifiers of the predictive model may determine the probability of the customer suspending or resuming one or more instances based at least in part on the given data. With this information the service provider or a service of the service provider may initiate serialization operations before the serialization event is requested by the customer or another service of the service provider.

In various embodiments, the service provider may use a variety of data sets in order to determine a predictive model. The predictive model may be based on the market for virtual machine instances operated by the service provider, behavior of the instances, customer interaction with the instances, customer interaction with one or more other systems, instance configuration, instance type, geographic location of a physical host for a particular instance, data centers which may be used to resume a particular instance and any other information suitable for determining the probability of an event. Based on the type of data used to generate the predictive model, in various embodiments, the predictive model may be used to generate a schedule of serialization events. According to the schedule generated by the predictive model, the virtual computer system service or the virtual computer system service management subsystem may prefetch or pre-send serialization data. For example, according to the generated schedule, a group of virtual machine instances operating a batch job, may resume at the same time (or approximately the same time) every day. The virtual computer system service management subsystem may begin retrieving instance data from storage at some amount of time before the instances are scheduled to resume according to the generated scheduled. In various embodiments, the amount of time may be some predetermined or calculated factor of the time it takes to retrieve all of the instance data from storage or some percentage of that time. The predictive model may be configured to account for a variance in customer behavior and attempt to load an image of the virtual machine instance into memory before a corresponding request is received from a customer. For example, a variance of one hour may be used to adjust the predicted start time and begin loading an image of the virtual machine instance into memory earlier.

In various embodiments, techniques may be used to reduce the time required to serialize an instance or otherwise optimize serialization events. For example, the virtual computer system service management subsystem or other system operated by the service provider may communicate with the Operating System (OS) of an instance and determine which areas of memory or other instance data that may not be required for serialization, thereby reducing the amount of data that is required to be stored or retrieved during a serialization event. Other techniques to reduce the amount of data may be used such as compression, serialization of only data which has changed during the operation of the instance or any other technique to reduce the amount of data to be stored. In various embodiments, the customer may be told a serialization event has been completed, but the operation may still be running in the background. For example, a customer may transmit a command to suspend an instance and receive confirmation that the instance has been successfully suspended. However, the instance may still be running on the physical host until all of the serialized instance data has been written to storage.

In various embodiments of the present disclosure, operations to resume an instance may include operations performed by the virtual computer system service management subsystem or other system operated by the service provider in order to determine some amount of instance data less than the entire amount of instance data stored in persistent storage required to launch the instance. The instance may then be launched once the predetermined instance data has been loaded and notification may be sent to the customer while the rest of the instance data is loaded in the background. In various embodiments, predictive modeling may be used to determine instance data which may be loaded before launching the instance and instance data which may be loaded in the background after the instance has been launched. In various embodiments, the instance data may be stored in on-demand data storage, block-level data storage, cache or any other suitable storage device. Instance data may be continuously written to storage during operation or all of the instance data may be written to storage once a serialization event has begun.

In various embodiments, once a request is received from the customer, serialization operations may be completed. For example, an image of an instance may be loaded into the memory of a physical host and, once the customer transmits a request to resume the instance, the management subsystem or some other system of the service provider may launch the instance. In various embodiments, if the predictive modeling system initiates serialization operation based on a determination that a serialization event is likely to occur, but a corresponding request from a customer or some other system to perform the serialization event is not received within a predetermined or calculated amount of time, the operation may be reversed. For example, the predictive modeling system may determine a customer will resume an instance and begin loading an image of the instance into memory, but if the corresponding request to resume the instance is not received, the image may then be deleted or otherwise caused to be removed from memory.

FIG. 1 shows an illustrative example 100 of an aspect of improved serialization of virtual machine instances in accordance with various aspects of the present disclosure. As noted above, the techniques described herein are applicable to improved latency of serialization events in an environment where computing resources are distributed in various geographic locations and connected to each other over a network. Accordingly, FIG. 1 shows an example of virtual machine instance 102 at some point in time prior to a serialization event occurring. The instance 102 may be executed by a physical host operated by the virtual computer system service, described in detail below with reference to FIG. 2. In various embodiments, the instance 102 may be operated by a customer or may be part of a fleet or group of instances operated by a customer. At some point in time, during operation of the instance 102, the serialization event 104 may occur. During the serialization event 104 data is written to persistent storage 108. At some point in time after the serialization event 104 a deserialization event 106 may occur. Serialization events 104 and 106 include suspending instances, resuming instances, migration of instances, hardware upgrades, software upgrades, virtual machine instance snapshots or any other event that may cause data corresponding to the instance to be written to or copied from persistent storage 108.

In various embodiments, the virtual computer system service is controlled by a virtual computer system service management subsystem (also referred to as a management subsystem), to be discussed in greater detail in reference to FIG. 2 below. The management subsystem may determine that instance 102 may have a serialization event 104 occur and commence the serialization operations 110 at some point in time before the serialization event 104 occurs. Similarly, the management subsystem may determine that an instance may be deserialized 106 at some point and began deserialization operations 114 before the instance is to be deserialized 106. The management subsystem may use predictive modeling to determine the probability of a serialization event occurring. Using a predictive model, the management subsystem or some other system may determine if the probability of an event occurring exceeds a predetermined threshold. If the probability exceeds the threshold, the management system may commence serialization operations.

In various embodiments, the management subsystem or some other system may use a variety of data in order to determine a predictive model, such as instance behavior, customer behavior, instance attributes, market for instances, instance interaction with other services operated by the service provider or any other data or combination of data sets suitable for predicting behavior. For example, the management subsystem may generate a predictive model based on instance 102 behaviors, such as resources or services used by the instance, system memory or disk block access, operating system of the instance, instance interaction with hardware or any other behavior suitable for modeling. Furthermore, the management subsystem may generate a variety of predictive models in order to predict different serialization events or serialization operations. For example, the predictive modeling system may generate a model to predict instance suspension or instance resumption.

A predictive model may be generated to predict a variety of events corresponding to the behavior of customers of the service provider. The behavior may include the customer's interaction with other systems or services provided by other service providers. For example, a predictive model may be generated using information corresponding to the customer's interaction with a building security system such as a keycard lock, security camera, biometric scanner or other security device. Data from the various systems (e.g., information from a keycard system that tracks use of keycards through various card readers) may be used for generating one or more predictive models, the generated predictive models may be used in connection with the other data that is gathered (e.g., launch times) or other predictive models in order to predict one or more serialization events. The generated model may be used predict a time to initiate one or more operations by the service provider, such as suspending or resuming an instance. For example, a predictive model may be generated to predict when a particular customer will use their keycard to enter or exit an office building. The predictive model may then be used to predict a time when the customer will enter the office building and based on the predicted time determine a time to initiate loading an image of a virtual machine corresponding to the customer into memory. Similarly, a predictive model may be used to determine when the customer will exit the office building and the virtual machine corresponding to the customer may be suspended. Data collected from other systems may be used to override a predicted start time for a serialization event. For example, a predictive model based on user behavior may predict a start time for resuming an instance from a suspended state. However, data collected from a security system may indicate that the particular user has entered the office and this data may be used to override the predicted start time and begin resuming the instance.

In various embodiments, a model may be generated to predict instance data requiring serialization or deserialization, as well as instance data that does not require serialization or deserialization, during a serialization event, such as serialization events 110-114. The predictive model generated may determine instance data 114 to be copied into memory upon resumption of instance during serialization event 106, which may be less than the entirety of instance data corresponding to the instance. For example, the management subsystem may determine using the predictive model that instance 102 only accesses a particular portion of the virtual disk allotted to the instance 102. Using this information the management subsystem may determine that serialization operation 114 will initially copy the portion of the virtual disk used by instance 102 during serialization event 106. Once copied, the management subsystem may notify the customer using the notification service (to be discussed in detail below with reference to FIG. 2) that the instance has been loaded and is ready for operation while the remainder of the virtual disk is copied to the instance.

Figure 2:
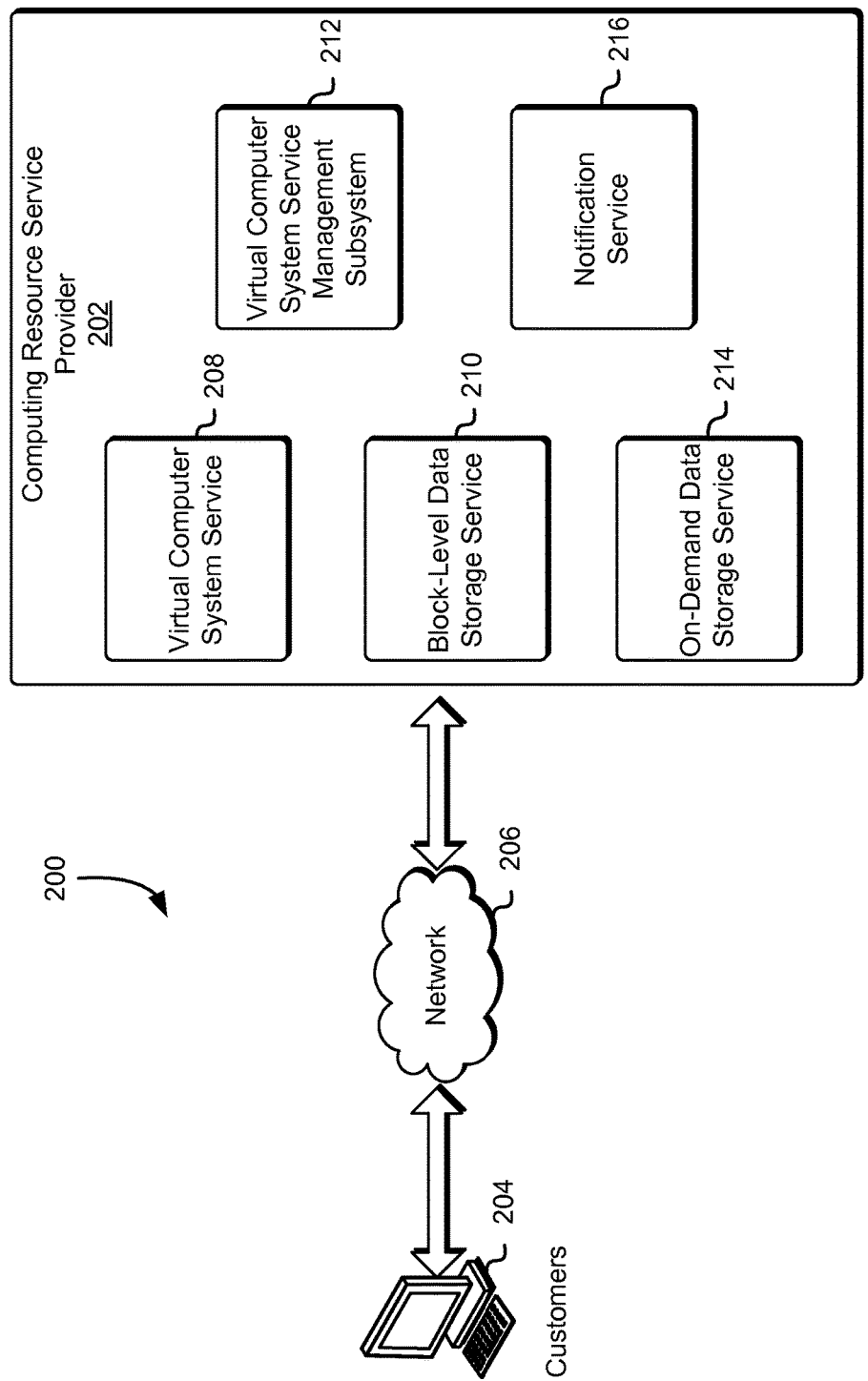
FIG. 2 shows an example of a customer connected to a computing resource service provider.

FIG. 2 shows an example 200 of a customer connected to a computing resource service provider. The computing resource service provider 202 may provide a variety of services to a customer 204. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network may be a communication network, such as the Internet, an intranet, or an Internet service provider (ISP) network. Some communications from the customer 204 to the computing resource service provider 202 may cause the computing resource service provider 202 to operate in accordance with one or more embodiments described herein or a variation thereof.

The computing resource service provider 202 may provide various computing resource services to its customers. The services provided by the computing resource service provider 202 in this example include a virtual computer system service 208, a block-level data storage service 210, a virtual computer system service management subsystem 212, an on-demand data storage service 214 and a notification service 216. It is noted that not all embodiments described herein include the services 208-216 of the computing resource service provider 202 and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block-level data storage service 210).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications, or, generally, to serve as computing power for the customer. Other applications for the virtual computer systems may be to support database applications, electronic commerce applications, business applications and/or other applications.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 may also include an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly so as to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may also be accessible to the virtual computer system service management subsystem 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and a browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes, such as monitoring applications executing in the virtual computer system service, workflow systems, time-sensitive information updates, mobile applications, and many others. In various embodiments the notification service 216 may be used by a troubleshooting service to provide troubleshooting information to the customer 204.

As illustrated in FIG. 2, the computing resource service provider 202, in various embodiments, includes a virtual computer system service management subsystem 212. The virtual computer system service management subsystem 212 in an embodiment is a computer system (i.e., collection of computing resources) configured to perform operations involved in management of customer instances. For instance, the virtual computer system service management subsystem 212 may initiate suspend or resume instance operation at the request of customers. The virtual computer system service management subsystem 212 may also perform or cause to be performed other serialization operations or serialization events. In various embodiments, the virtual computer system service management subsystem 212 may also perform or cause to be performed predictive modeling and characterization of data sets for determining the probability of a particular outcome or event occurring.

Figure 3:
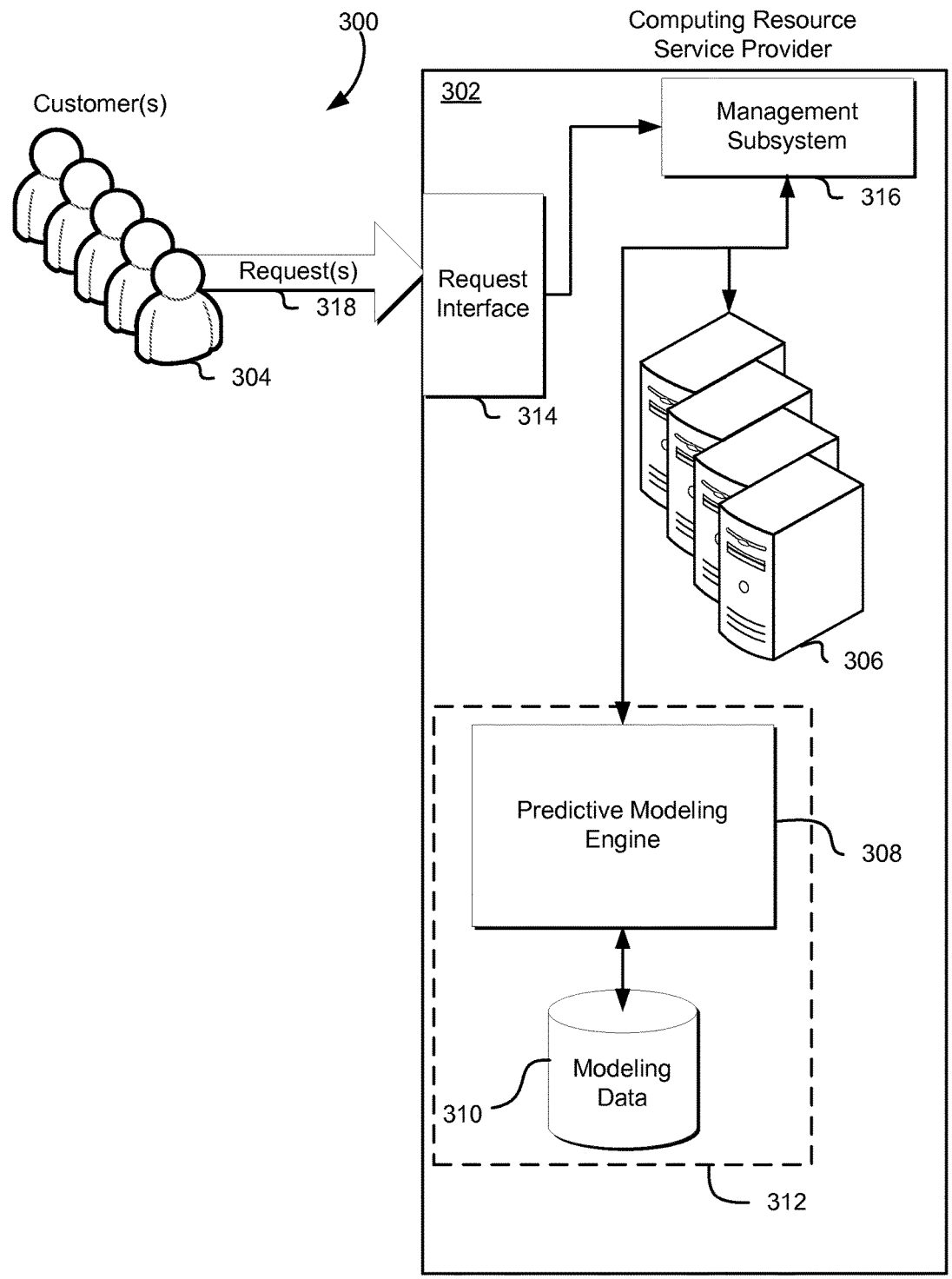
FIG. 3 shows an illustrative example of an environment in which various embodiments of the present disclosure may be practiced.

FIG. 3 shows an example 300 of customers sending requests to a computing resource service provider 302. The computing resource service provider 302 may provide a variety of services to the customer 304. The customer 304 may send request 318 to the service provider 302 over a network, such as the Internet. The request 318 may be appropriately configured API calls generated by the customer or a management console with which the customer interacts with in order to manage the operation of one or more virtual machine instances. In various embodiments, the request 318 may be received by a request interface 314 operated by the service provider. The request interface 314 may direct the request to the appropriate system, such as the management subsystem 316 shown in FIG. 3. As requests 318 are received by the request interface 314, information corresponding to the requests may be used to continuously update the predictive model. In various embodiments the management subsystem may manage the operation of one or more virtual machine instances 306. The management subsystem may also manage the operation of the predictive modeling system 312. The predictive modeling system 312, in various embodiments, may contain a predictive modeling engine 308 and modeling data 310 for use with the predictive modeling engine 308.

In various embodiments, the management subsystem may collect various data sets for use with predictive modeling system 312. Various systems of the present disclosure, such as the management subsystem and the predictive modeling system, may be implemented using one or more computer systems each containing non-transitory computer-readable storage media for storing instructions that when executed cause the system to perform a variety of functions. The management subsystem 316 may collect data directly from instances or from the requests 318 transmitted to the management subsystem 316 from the request interface 314. In various embodiments the predictive modeling system 312 may collect the data sets itself. The data collected may include information regarding customer usage of instances, operations of instances, operation of services or other suitable data for use with predictive modeling. For example, the management subsystem 316 may collect data corresponding to customer behavior from the request 318 received from the request interface. The information may be collected and stored in the modeling data 310 data store, for use by the predictive modeling engine 308. In various embodiments, the modeling data 310 data store may be on-demand data storage, block-level storage or any other suitable data store.

The predictive modeling engine 308 may use data stored in the modeling data 310 storage to generate a predictive model, which may contain one or more classifiers. In various embodiments, modeling data 310 may also contain one or more predictive models and classifiers for use by the predictive modeling system 312 in determining the likelihood of a serialization event. Multiple predictive models may be correlated and information regarding the predictive models and any correlation may be used to update the predictive models. Furthermore, information from one or more predictive models may be used to seed newly created predictive models. For example, customers in a particular geographic location may resume their corresponding instances around the same time each day. A predictive model based at least in part on such customer behavior may be used to seed another predictive model for a new customer in the same geographic area. The predictive modeling engine may use one or more predictive modeling algorithms to generate the predictive model and/or classifiers, such as group method of data handling, naïve Bayes, k-nearest neighbor, majority classifier, support vector machines, logistic regression, uplift modeling or any other suitable predictive modeling algorithm. The generated model and/or classifiers may be used to determine the probability of and event occurring based on a given data set. In various embodiments, the predictive model may be used to determine a schedule or particular time at which a serialization event may occur. For instance, data corresponding to customer behavior may be collected by the management subsystem 316 and provided to the predictive modeling system 312 for analysis by the predictive modeling engine 308. The predictive modeling engine 308 may determine, using one or more predictive modeling algorithms, that a particular customer suspends and resumes instances at a similar time every day. The predictive modeling system 312 may, as a result of this determination, initiate suspend or resume operations at some point in time prior to when the customer may suspend or resume instances.

The predictive model and any schedule generated in accordance with the predictive model may be based on the role of the virtual machine instance. For example, the virtual machine instance may be used to provide an audit service or other service operated by the customer, and the customer may execute the virtual machine instance on a predetermined or as-needed basis. A predictive model may be generated based on these roles and the model may be used to determine when to suspend or resume the instance. Returning to the example above, a predictive model may be based on the role of the virtual machine instance which operates the audit service for the customer, the audit service may operate once a week and remain idle the remainder of the time. The predictive model may be used to determine when the audit service will be used, instantiate the virtual machine instance at some point in time before it is to be used and suspend the virtual machine instance at some point in time after it is used.

The predictive modeling system 312 may initiate serialization events directly or by submitting appropriately configured API calls to the corresponding system, such as the management subsystem 316. For example, the management subsystem may control instance suspend, resume and migration functions and the predictive modeling system 312 may submit a request to initiate suspend, resume or migration functions to the management subsystem when the probability of the particular function occurring is at or beyond a predetermined threshold. For example, a predictive model may be generated based on the spot price of instances and the probability of serialization events may be determined based on data corresponding to the price of executing an instance. In various embodiments, the predictive modeling engine 308 may monitor data and determine the probability of an event occurring at some point in the future. Using the example above, the predictive modeling engine 308 may monitor the price of spot instances and determine the probability of the price falling below a particular amount and which instances may be resumed at that price point. The predictive modeling system 312 may determine if the probability of the spot price falling below a particular price point is above a predetermined threshold, to initiate resume operations for particular instances likely to be resumed if the spot price falls.

In various embodiments, once the management subsystem 316 receives a request from the predictive modeling system 312 to perform one or more serialization operations, the management subsystem may communicate with the hypervisor or directly with the virtual machine instance itself to initiate the serialization operations. The predictive modeling system 312 may also communicate with the operating system executing on the instance in order to reduce the amount of instance data required to be copied during a serialization event. For example, the predictive modeling system 312 or some other system may determine what area of memory the instance uses for cache which may be excluded from serialization. The predictive modeling system 312 may also communicate with the instance in such a way that the instance becomes virtualization aware and an agreement on memory usage between the instance and the predictive modeling system may be established. In various embodiments, the predictive modeling system 312 may also model instance behavior in order to determine memory usage by the instance. This model may be used in order to determine areas of instance memory or data that may be ignored during serialization or may be serialized at a later time.

Figure 4:
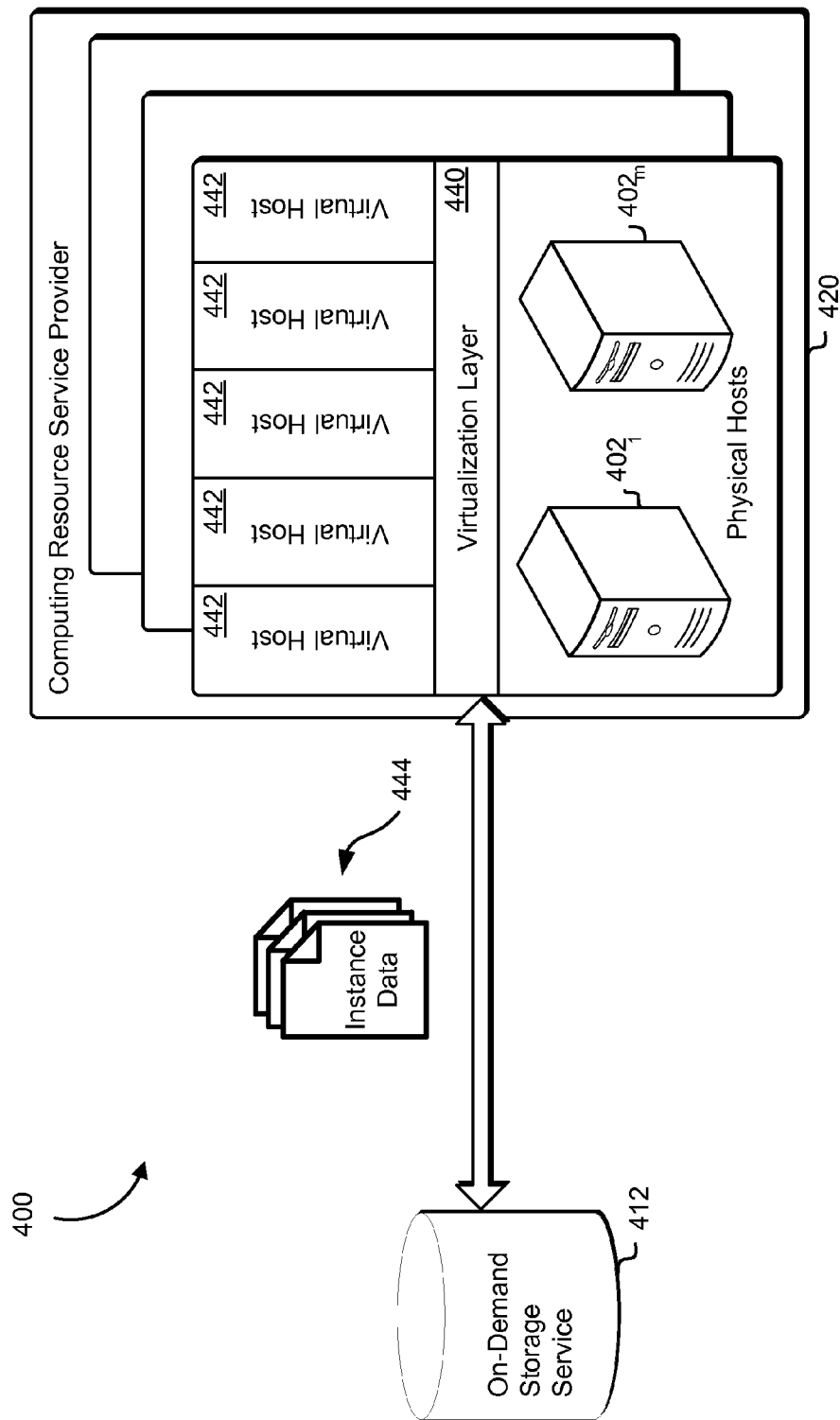
FIG. 4 shows a diagram illustrating a manner in which virtual machine data may be stored in accordance with at least one embodiment.

In order to decrease latency of various serialization events, a predictive model may be used as described above to reduce the amount of instance data and pre-fetch the instance data. FIG. 4 accordingly shows an illustrated example of an environment 400 in which pre-fetched instance data may be used during a serialization operation. As illustrated in FIG. 4, computing resource service provider 420 operates a multitude of physical hosts $402_{1-m}$. The physical hosts $402_{1-m}$ may be any device or equipment configured to execute instructions for performing data computation, manipulation, or storage tasks, such as a computer or a server. A physical host 402 may be equipped with any needed processing capability, including one or more processors, such as a central processing unit (CPU), a graphics processing unit (GPU), or a digital signal processor (DSP); memory, including static and dynamic memory; buses; and input and output ports that are compliant with any handshaking, communications, or data transfer protocol.

A virtualization layer 440 in the computing resources service provider 420 enables the physical hosts 402 to be used to provide computational resources upon which one or more virtual hosts 442 may operate. The virtualization layer 440 may be any device, software, or firmware used for providing a virtual computing platform for the virtual hosts 442. The virtual computing platform may include various virtual computer components, such as one or more virtual CPUs, virtual memories, virtual disks, and the like. The virtual hosts 442 may be provided to the customers of the service provider 420 and the customers may run an operating system or an application on the virtual host 442. Further, the computing service resource provider 420 may use one or more of its own virtual hosts 442 for executing its applications or services, such as the predictive modeling system described above. Examples of the virtualization layer 440 include a bare metal hypervisor or a hosted hypervisor.

The virtual hosts 442 operated by the customers may further generate instance data 444 based on the operation of the virtual host 442. Instance data 444 may include virtual machine memory, virtual disk memory, virtual CPU state, virtual CPU memory, virtual GPU memory, operating system cache, operating system page files, virtual machine ephemeral storage, virtual interfaces, virtual devices or any other data associated with an instance. During a serialization event, instance data may be saved directly by the virtual host 442 in the on-demand storage service 412 or the virtualization layer 440 may include a hypervisor which may save the instance data 444 to the on-demand storage service 412. In various embodiments, instance data includes operation of the virtual host by the customer and the operational status of the virtual host. Data regarding operation of the virtual host by the customer includes any information regarding the actions performed by the customer (e.g., commands entered by the customer into a terminal or mouse click performed by the customer in a GUI). Data regarding the operational status of the virtual host includes any information not related to an action performed by the customer (e.g., memory usage of the virtual host, file systems, information regarding virtual CPUs, or any other information regarding the virtual host). In various embodiments, instance data 444 may be periodically written to on-demand storage as described above in reference to FIG. 2. This data may be in any format suitable for operation with the predictive modeling system as described above in reference to FIG. 3. The instance data 444 may, in various embodiments, be converted into a format suitable for use with the predictive modeling engine. In various embodiments, instance data 444 may be stored persistently using the on-demand storage service 412 in such a way that the predictive modeling system may use the instance data to determine the probability of a serialization event occurring.

In various embodiments, instance data 444 may be stored in on-demand storage service 412 for use with the predictive modeling system in order to generate one or more predictive models and/or classifiers for use in determining the probability of serialization events occurring. Instance data 444 may be collected from virtual hosts 442 and stored in the on-demand storage service 412. In various embodiments, collection and storage of instance data 444 may be triggered once the predictive modeling system determines the probability of a serialization event is above a predetermined threshold. The virtualization layer 440, the virtual host 442 or some other system may perform one or more serialization operations at some point in time before the time the predictive modeling system determined the serialization event will occur. For instance, the predictive modeling system may determine that a serialization event will occur within the next hour and send a corresponding request to the management subsystem, at some point before the serialization event is predicted to occur the virtualization layer 440 may initiate serialization operations in response to a request from the management subsystem.

In various embodiments, serialization operations may occur after the customer request or not at all. For instance, the customer may transmit a suspend request to the service provider and receive notification that the instance has been serialized, however the instance may still be running on the virtual host 442 and instance data 444 may not have been copied to on-demand storage service 412. The instance may continue to execute on virtual host 442 until the customer resumes the instance or the resources of the virtual host 442 are required by another instance. Similarly, the serialization operations may be initiated once the customer is notified that the instance has been suspended. For example, the customer may receive notification that the serialization operation has completed but the instance data 444 is still being copied to the on-demand storage service 412. In various embodiments, the predictive modeling system may be used to predict when virtual host 442 resources may be required and commence serialization operations at some point in time before the resources may be required. Using the example above, after the customer has been notified that the requested serialization has occurred but while the instance is still executing on the virtual host 442, the predictive modeling system may determine that the probability that the resources of the virtual host may be needed to execute another virtual machine instance exceeds a predetermined threshold. The predictive modeling system may then send a request to the management subsystem to serialize virtual host 442 by copying instance data 444 to on-demand storage 412.

In various embodiments, the predictive modeling system may also determine when to retrieve data from on-demand storage 412. The predictive modeling system may, using one or more models or classifiers, determine that the probability of a serialization event occurring is above the predetermined threshold and the particular event may be a serialization event that requires instance data 444 to be copied from storage 412 to a physical host 402. For example, the predictive modeling system may determine that the probability of a particular instance being resumed is above the predetermined threshold. The predictive modeling system or some other system may then transmit a request to begin copying instance data 444 from on-demand storage service 412 to a physical host 402 through the virtualization layer 440. In various embodiments, the predictive modeling system may also determine the probability of serialization events such a migration and send a request to begin migrating the instance data 444 to a new physical host 402.

Figure 5:
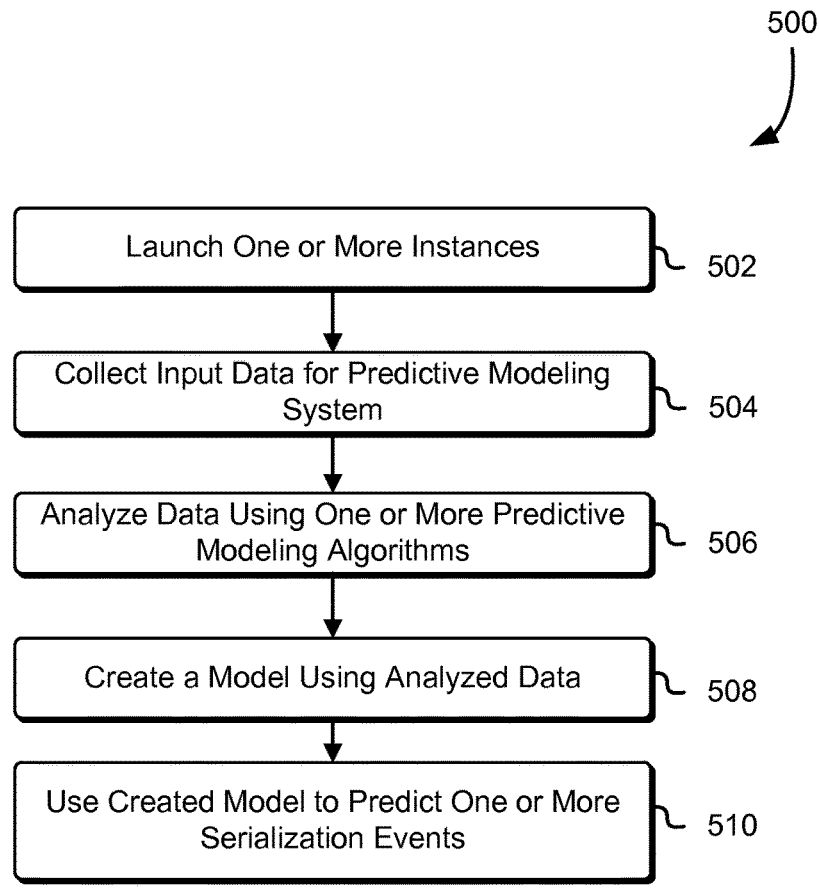
FIG. 5 shows an illustrative example of a process for creating a predictive model in accordance with at least one embodiment.

FIG. 5 shows an illustrative example of process 500 which may be used to determine the probability of a serialization event given a particular data set. The process 500 may be performed by any suitable system, such as by the computer resource service provider as described in connection with FIG. 3 and/or an appropriate component thereof, such as by the virtual computer system service management subsystem 316. Returning to FIG. 5, in an embodiment, the process 500 includes launching one or more virtual machine instances 502. The virtual machine instances may be launched by the service provider at the request of one or more customers of the service provider. Once the instances have been launched 502, data corresponding to the instances may be collected for input into the predictive modeling system 504. The collected input data 504 may then be analyzed using one or more predictive modeling algorithms 506. Collecting and analyzing the data may be performed by any suitable system, such as by the computer resource service provider as described in connection with FIG. 3 and/or an appropriate component thereof, such as by the predictive modeling system 312.

Returning to FIG. 5, in various embodiments, the one or more predictive modeling algorithms may generate data to be used to create a predictive model 508. In various embodiments, the predictive model may also include one or more classifiers created from the data generated by the one or more predictive modeling algorithms. Once the predictive model and/or classifiers have been created, one or more serialization events may be predicted based on a given data set. For example, the predictive modeling systems, as described in connection with FIG. 3 and/or an appropriate component thereof, may collect and monitor data corresponding to various aspects of the service provider, such as the spot market for instances. The predictive modeling system may determine based on this information the probability that one or more serialization events will occur 510. In various embodiments, the probability calculated by the predictive model may be used to determine or predict one or more serialization events. Information corresponding to the predicted serialization event 510 may be used to update the predictive model created using the analyzed data 508. In numerous variations of process 500, the model created may be continuously or periodically updated with collected input data. For example, data corresponding to the spot market for instances may be continuously or otherwise collected and analyzed and the analyzed data may then be used to update the predictive model.

Figure 6:
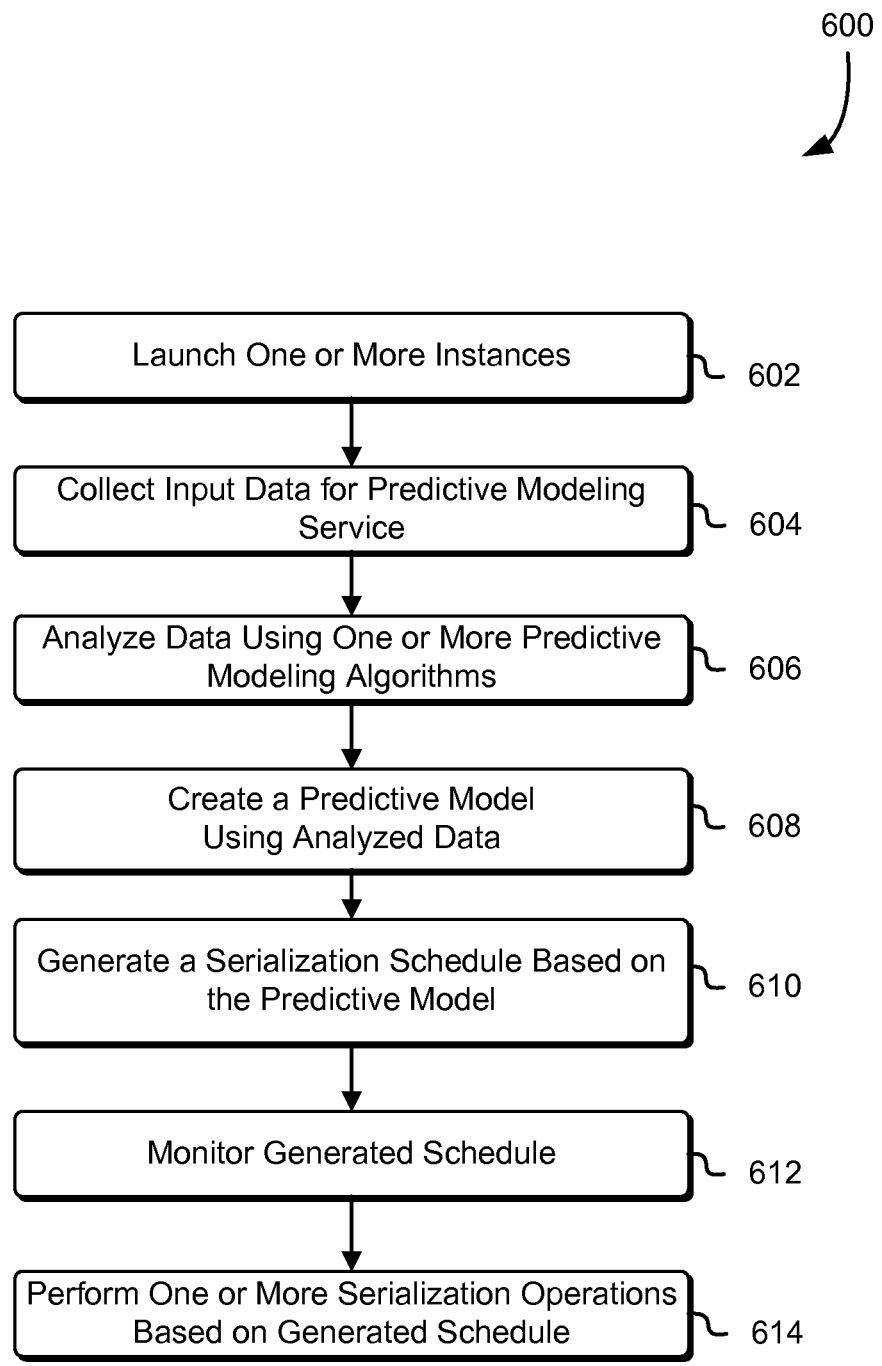
FIG. 6 shows an illustrative example of a process for performing a serialization event in accordance with at least one embodiment.

FIG. 6 shows an illustrative example of process 600 which may be used to determine the probability of a serialization event given a particular schedule based on a predictive model. The process 600 may be performed by any suitable system, such as by the computer resource service provider as described in connection with FIG. 2 and/or an appropriate component thereof, such as by the virtual computer system service management subsystem 212. Returning to FIG. 6, in an embodiment, the process 600 includes launching one or more virtual machine instances 602. The virtual machine instances may be launched by the service provider at the request of one or more customers of the service provider. Once the instances have been launched 602, data corresponding to the instance may be collected for input into the predictive modeling system 604. The data corresponding to the instances may be data corresponding to the operation of the instance by the customer, data corresponding to the instance itself, attributes of the instances, operations of the service provider or component thereof or any other data suitable for use in generating a predictive model.

The collected input data 604 may then be analyzed using one or more predictive modeling algorithms 606. The predictive modeling algorithms may be any algorithms described above or combination thereof. Collecting and analyzing the data may be performed by any suitable system, such as by the computer resource service provider as described in connection with FIG. 3 and/or an appropriate component thereof, such as by the predictive modeling system 312. Based on the results of the analyzed data using one or more predictive modeling algorithms 606, a predictive model is created 608. The created predictive model 608 may then be used to generate a serialization schedule 610. In various embodiments, the serialization schedule may be based at least in part on the predictive model. For example, analyzing the collected data corresponding to one or more instances may generate a predictive model that indicate the highest probability of particular instances being resumed is between eight and nine o'clock weekday mornings. The service provider or suitable system thereof may generate a schedule for each particular instance based on the determination by the predictive model.

The generated schedule 610 may be monitored 612 to determine if an action is required based on the schedule. In various embodiments, the schedule may include an estimate of the amount of time a particular serialization event may take to complete. For example, resuming a particular instance may take an estimated three minutes and this time may be included in the schedule such that the serialization operations are schedule to commence three minutes before the serialization event is predicted to occur. In various embodiments, the estimated time may be included in the schedule when it is generated 610 or may be calculated and adjusted for by appropriate systems or systems monitoring the schedule 612. Based on the monitored schedule, one or more serialization operations are performed 614. In various embodiments, the operations may be performed by any suitable system, such as by the computer resource service provider as described in connection with FIG. 2 and/or an appropriate component thereof, such as by the predictive modeling system 212.

Figure 7:
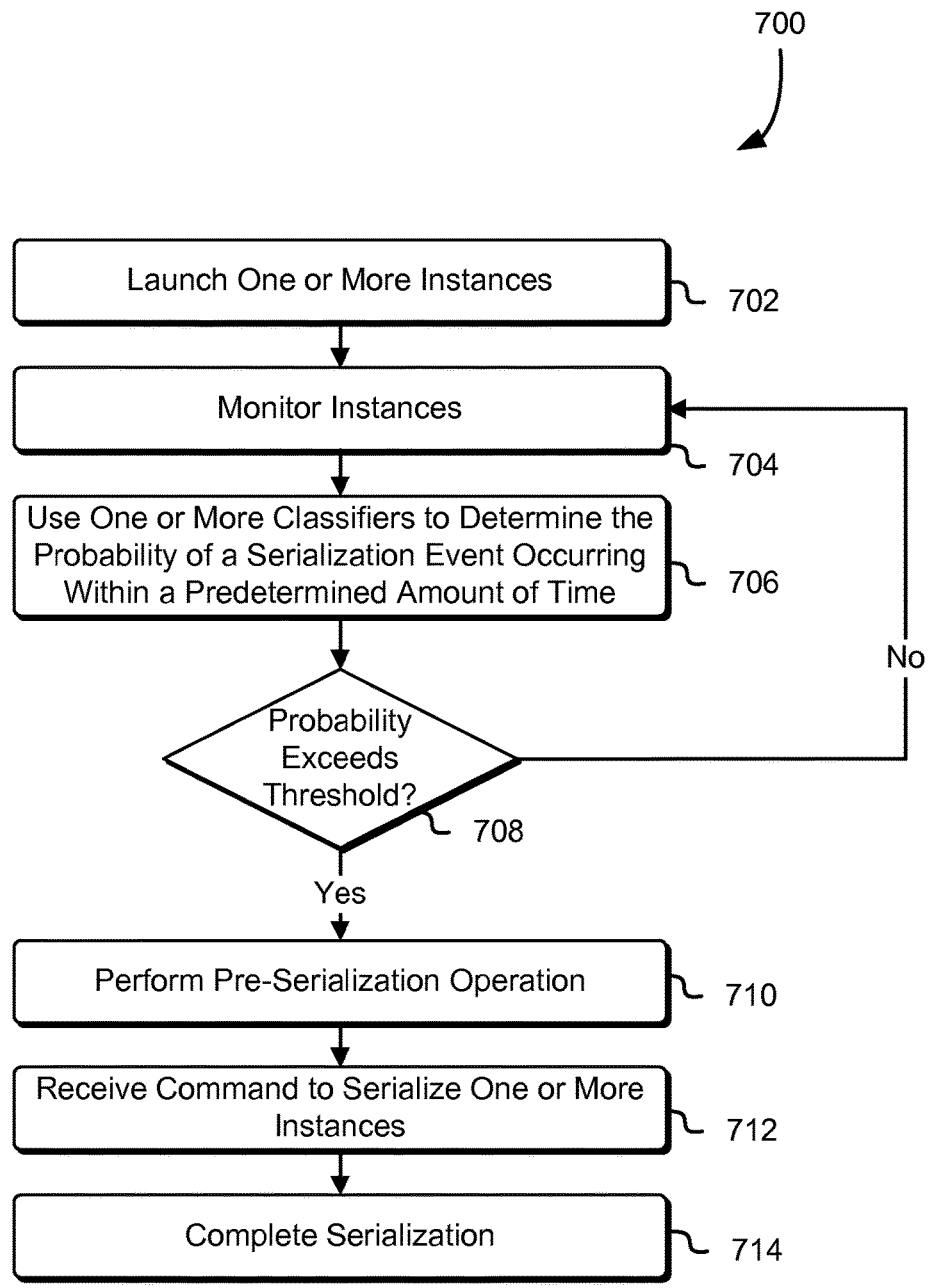
FIG. 7 shows an illustrative example of a process for performing a serialization event in accordance with at least one embodiment.

FIG. 7 shows an illustrative example of process 700 which may be used to determine the probability of a serialization event given a set of data corresponding to one or more monitored instances. The process 700 may be performed by any suitable system, such as by the computer resource service provider as described in connection with FIG. 2 and/or an appropriate component thereof, such as by the virtual computer system service management subsystem 212. Returning to FIG. 7, in an embodiment, the process 700 includes launching one or more virtual machine instances 702. The virtual machine instances may be launched by the service provider at the request of one or more customers of the service provider. Once the instances have been launched 702, the instances may be monitored 704 by an appropriate system or component thereof, such as by the computer resource service provider as described in connection with FIG. 3 and/or an appropriate component thereof, such as by the management subsystem 316.

Monitoring instances 704, in various embodiments, may include monitoring a variety of data or data sets, such as the date and time, operations performed by the customers, operations performed by instances, requests received by the service provider, operations of the service provider or system thereof, type of instances, type of hypervisors or any other data suitable for monitoring instance. The monitored data may then, using or more classifiers of a predictive model, be used to determine the probability of a serialization event occurring within a predetermined or calculated amount of time 706. In numerous variations of process 700, information corresponding to monitored instances 704 may be used to generate or update the predictive model. Returning to FIG. 7, if the probability of the serialization event occurring exceeds a predetermined threshold 708, pre-serialization operations 710 may then be performed. In various embodiments, pre-serialization operations 710 may include estimating the amount of time a serialization operation may take to perform, generating appropriate API requests, communicating with various systems of the service provider, determining operations to perform in order to complete the probable serialization events, determining a storage location for the serialized instance, determining instance data to be serialized or any other operation required.

Once the pre-serialization operations have been completed, a command to serialize one or more instances 712 may be received by a suitable system, such as by the computer resource service provider as described in connection with FIG. 3 and/or an appropriate component thereof, such as by the management subsystem 316. For example, the predictive modeling system may determine that the probability of a particular instance being migrated within a predetermined amount of time exceeds the predetermined threshold and may send a request to the management subsystem to initiate migration of the instance. Once a request is received, serialization is performed and completed 714. In various embodiments, completing serialization 714 may also include sending a notification to the customer. The notification may be sent using the notification service 216 described in connection to FIG. 2.

Figure 8:
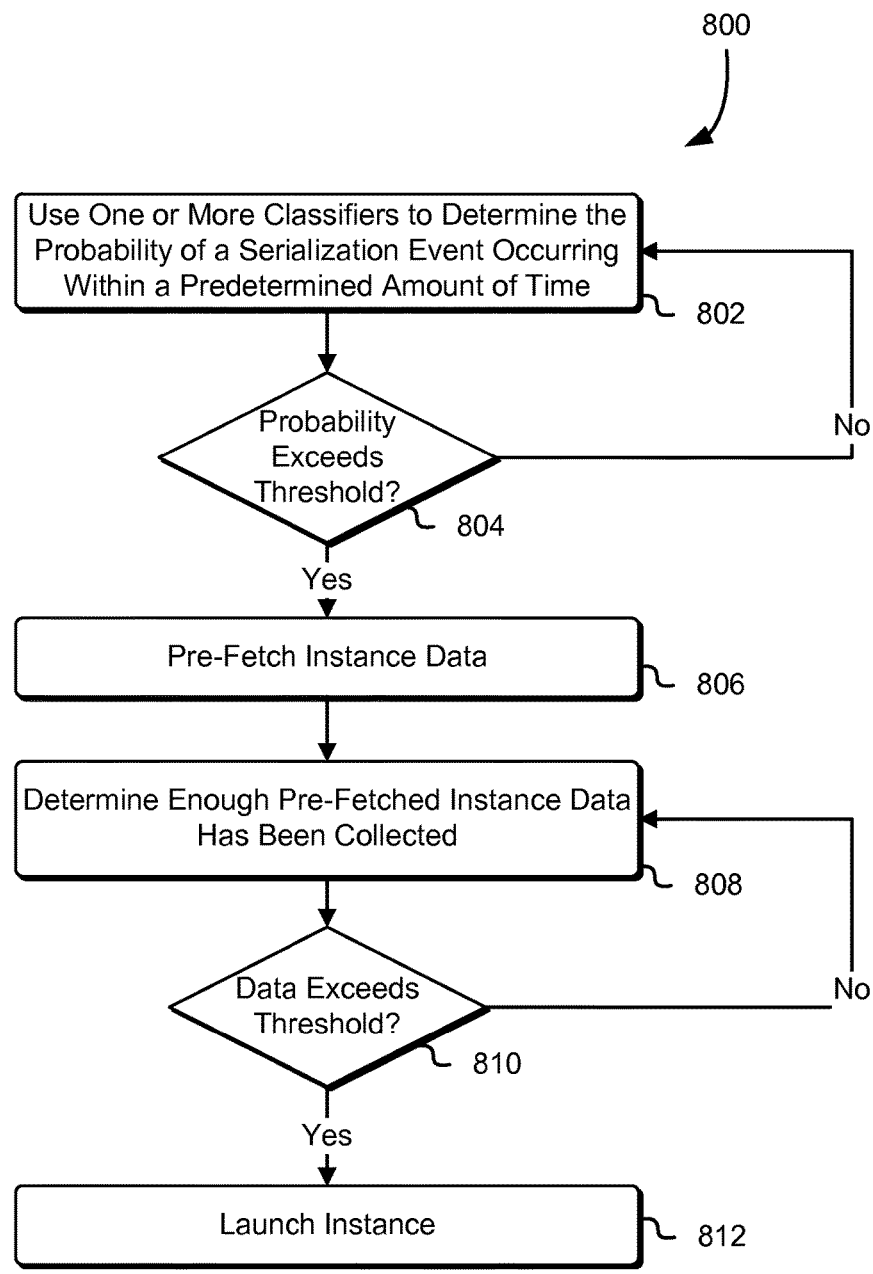
FIG. 8 shows an illustrative example of a process for predicting a serialization event in accordance with at least one embodiment.

FIG. 8 shows an illustrative example of process 800 which may be used to determine the probability of a serialization event given a particular schedule based on a predictive model. The process 800 may be performed by any suitable system, such as by the computer resource service provider as described in connection with FIG. 2 and/or an appropriate component thereof, such as by the virtual computer system service management subsystem 212. Returning to FIG. 8, in an embodiment, the process 800 includes using one or more predictive models and/or classifiers to determine the probability of a serialization event occur with a predetermined amount of time 802. The determination may be based on a variety of data sets, such as described above in connection with FIG. 7.

In various embodiments, the predictive modeling system may receive, as input data, data collected from one or more virtual machine instances, one or more services of the service provider or any other data suitable for use with a predictive model. Based on the input data, the predictive modeling system or component thereof may return the probability of a serialization event occurring for a particular instance. If the returned probability exceeds a predetermined threshold 804, it may be determined that a serialization event may occur and the instance data may be pre-fetched 806. For example, the predictive model may determine the probability of a particular instance resuming within a particular amount of time exceeds the predetermined threshold and may send the appropriate request to the management subsystem to begin loading the instance data into memory of a physical host for operation of the instance. Loading instance data into memory of the physical host may include loading an image of the virtual machine, such as a disk image containing the complete contents of the virtual machine memory. In various embodiments, the predictive model may determine when to send the request to pre-fetch instance data based on the amount of time it takes to complete serialization operations.

While the instance data is being pre-fetched 806, it may be determine whether enough instance data has been pre-fetched 808 so as to allow operation of the instance. This determination may be based on the minimum amount of data required for the instance to function while appearing to the customer as if the entirety of the instance data has been loaded into memory. In various embodiments, the amount of data required may be determined by the predictive modeling system. For example, the predictive modeling system may determine, based at least in part on data collected from the instance, areas of memory most likely to be accessed by the particular instance. Based on this information, the particular instance data required to operate the instance may be determined and retrieved first when the instance data is being pre-fetched 806 from memory. Once it is determined that sufficient instance data 810 is loaded into memory, the instance may be launched 812 and notification may be sent to the customer.

Figure 9:
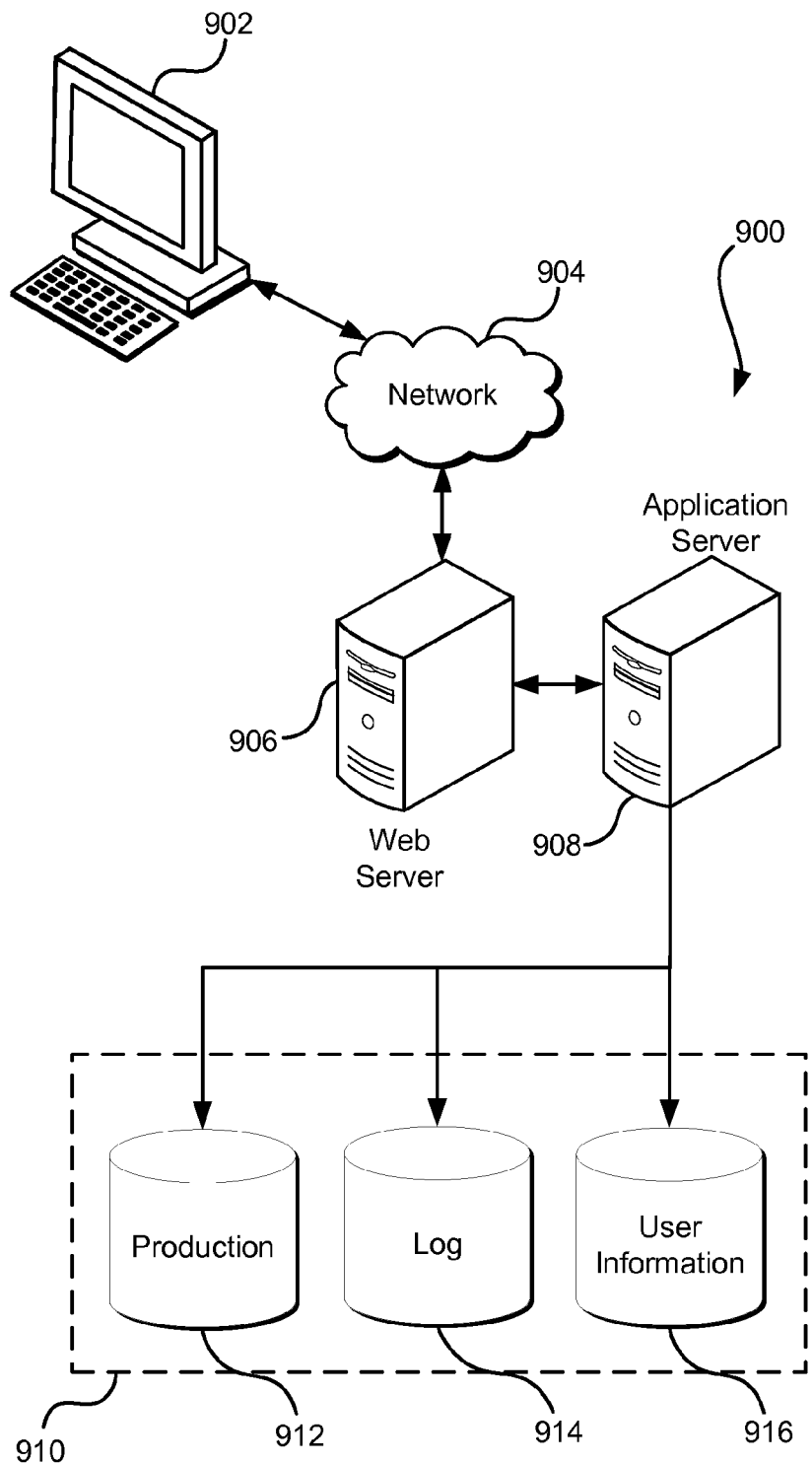
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 902 and the application server 908, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 910 can include several separate data tables, databases or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C2 or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. One or more non-transitory computer-readable storage media having collectively stored thereon instructions that, when executed by one or more processors of a system, cause the system to:

launch a plurality of virtual machine instances;

generate a predictive model for determining a probability of a particular virtual machine instance of the plurality of virtual machine instances being resumed from a suspended state, by at least:
  collecting input data corresponding to operations of at least one virtual machine instance of the plurality of virtual machine instances, the input data indicating memory locations accessed by the at least one virtual machine instance during execution;
  analyzing the collected input data using one or more predictive modeling algorithms; and
  generating the predictive model based at least in part on the analyzed input data;

use the generated predictive model to predict a time the particular virtual machine instance will be resumed;

use the predicted time to determine a start time, prior to the predicted time, for a plurality of operations involved in resuming the particular virtual machine instance to begin, such that the start time is determined using an expected duration of the plurality of operations to select the start time so that the plurality of operations are calculated to complete within a predetermined amount of time of the predicted time, at least one operation of the plurality of operations comprising loading the memory locations accessed by the at least one virtual machine instance during execution into a memory of the particular virtual machine instance; and cause the plurality of operations to occur in accordance with the determined start time, where the at least one operation is performed prior to other operations of the plurality of operations.

2. The one or more non-transitory computer-readable storage media of claim 1, wherein:
the predictive model is further used to generate a schedule of events; and
wherein causing the plurality of operations to occur further comprises causing the plurality of operations to occur in accordance with the generated schedule of events.

3. The one or more non-transitory computer-readable storage media of claim 1, wherein causing the plurality of operations to occur further comprises loading an image of the particular virtual machine instance into memory of a host computer system.

4. The one or more non-transitory computer-readable storage media of claim 3, wherein loading the image of the particular virtual machine instance into memory further comprises selectively loading portions of the image.

5. The one or more non-transitory computer-readable storage media of claim 1, wherein generating the predictive model further includes generating the predictive model based at least in part on data that indicates an instance type associated with the virtual machine instance.

6. The one or more non-transitory computer-readable storage media of claim 1, wherein generating the predictive model further includes generating the model based at least in part on a role of the particular virtual machine instance.

7. The one or more non-transitory computer-readable storage media of claim 1, wherein:
collecting input data further comprises collecting additional data corresponding to interactions between the at least one virtual machine instance and another system; and
analyzing the collected input data further comprises analyzing the collected additional data.

8. The one or more non-transitory computer-readable storage media of claim 1, wherein:
the plurality of operations are triggerable by a market price fluctuation in a market for virtual machine instance capacity; and
the input data corresponding to operations of at least one virtual machine instance of the plurality virtual machine instances further includes data corresponding to the market price.

9. The one or more non-transitory computer-readable storage media of claim 1, wherein:
the particular virtual machine instance is associated with a user; and
the input data corresponding to operations of at least one virtual machine instance of the plurality virtual machine instances further includes data corresponding to commands provided, by the user, to the at least one virtual machine instance.

10. A computer-implemented method, comprising:
under the control of one or more computer systems configured with executable instructions,
generating a model that relates to making an instance of a machine image available based at least in part on receipt of requests to launch instances and memory locations accessed by the instance, the generated model usable to forecast an event that relates to making a particular instance of the machine image available;
for the particular instance, using the generated model to predict a time to make the instance available or unavailable; and
using the predicted time to initiate a plurality of operations to make the instance available or unavailable prior to the predicted time, where at least one operation of the plurality of operations includes an operation on the memory locations accessed by the instance and that at least one operation is performed prior to other operations of the plurality of operations.

11. The computer-implemented method of claim 10, wherein:
using the generated model to predict the time to make the instance available or unavailable further includes using the generated model to calculate a schedule; and
causing the plurality of operations to occur in accordance with the calculated schedule.

12. The computer-implemented method of claim 10, wherein:
generating the model usable to forecast the event that relates to making the particular instance of the machine image available or unavailable includes creating a predictive model, by at least:
collecting input data;
analyzing the collected input data using one or more predictive modeling algorithms; and
updating the predictive model based at least in part on the analyzed input data.

13. The computer-implemented method of claim 12, wherein the input data includes data corresponding to a cost of executing instances.

14. The computer-implemented method of claim 12, wherein the input data includes a user of the particular instance's interaction with another system.

15. The computer-implemented method of claim 10, wherein the method further comprises:
after initiating the plurality of operations, receiving a command from a user of the particular instance to make the instance available; and
as a result of receiving the command, completing the execution the command.

16. The computer-implemented method of claim 10, wherein using the predicted time to initiate the plurality of operations to make the instance available or unavailable prior to the predicted time includes using an expected duration of the plurality of operations to select a start time prior to the predicted time so that the plurality of operations are calculated to complete within a predetermined amount of time of the predicted time.

17. The computer-implemented method of claim 10, wherein:
using the predicted time to initiate the plurality of operations to make the instance available or unavailable prior to the predicted time includes loading at least part of the machine image of the particular instance into memory of a host; and
causing the particular instance to be launched.

18. A system, comprising:
one or more processors; and
memory with instructions that, when executed by the one or more processors, make the system:
for a particular computer system instance, use a predictive model to determine a beginning time to initiate plurality of operations related to resuming execution of an instance of a machine image, where the predictive model is generated based at least in part on accessed memory locations of the particular computer system instance;
cause, prior to receipt of a command to resume the instance, initiation of the plurality of operations related to resuming execution of the instance in accordance with the determined beginning time, the plurality of operations including at least one operation comprising loading the accessed memory locations in to a memory associated with the instance and the at least one operations executed prior to other operations of the plurality of operations; and at a time after initiating the plurality of operations related to resuming execution of the instance, cause the instance to be resumed as a result of receiving the command.

19. The system of claim 18, wherein:

initiating the plurality of operations related to resuming execution of the instance includes causing a server to load the instance of the machine image into memory; and in response to receipt of the command, starting execution of the instance.

20. The system of claim 18, wherein using the predictive model to determine the beginning time to initiate plurality of operations related to resuming execution of the instance of the machine image includes using an expected duration of plurality of operations, involved in execution of the command, to select the beginning time such that the plurality of operations are calculated to complete within a predetermined amount of time of the beginning time.

21. The system of claim 18, wherein the plurality of operations related to resuming execution of the instance includes selecting a server and causing the server to obtain the machine image.

22. The system of claim 18, wherein the memory further includes instructions that make the system:

generate the predictive model to determine the beginning time to initiate the plurality of operations related to resuming execution of the instance of the machine image, by at least:

collecting input data; and analyzing the collected input data.

23. The system of claim 22, wherein the input data corresponds to interactions between the particular computer system instance with another system.

24. The system of claim 18, wherein the memory further includes instructions that cause the system to update the predictive model.

25. The system of claim 18, wherein initiating the plurality of operations related to resuming execution of the instance in accordance with the determined beginning time includes selectively loading the machine image of the instance into memory based on a determination.

* * * * *